United States Patent
Simone et al.

(10) Patent No.: US 11,900,094 B2
(45) Date of Patent: Feb. 13, 2024

(54) SYSTEM AND METHOD FOR PROVIDING SOFTWARE ROLLOUTS WITHIN A CONTROLLER-BASED CONTAINER ORCHESTRATION SYSTEM

(71) Applicant: Oracle International Corporation, Redwood Shores, CA (US)

(72) Inventors: Daniel Simone, Newtown, PA (US); Elvis Jakupovic, Detroit, MI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/510,037

(22) Filed: Oct. 25, 2021

(65) Prior Publication Data
US 2023/0126619 A1  Apr. 27, 2023

(51) Int. Cl.
*G06F 8/65* (2018.01)
*G05B 19/042* (2006.01)

(52) U.S. Cl.
CPC .......... *G06F 8/65* (2013.01); *G05B 19/0426* (2013.01); *G05B 2219/25082* (2013.01)

(58) Field of Classification Search
None
See application file for complete search history.

(56) References Cited

U.S. PATENT DOCUMENTS

| | | | |
|---|---|---|---|
| 10,657,061 B1 * | 5/2020 | Marriner | H05K 7/1485 |
| 10,691,568 B2 | 6/2020 | Avraham | |
| 11,593,003 B2 * | 2/2023 | Shilane | G06F 3/0644 |
| 2020/0034258 A1 | 1/2020 | Avraham | |
| 2020/0241863 A1 * | 7/2020 | Duvur | G06F 8/65 |
| 2020/0241864 A1 * | 7/2020 | Duvur | G06F 9/455 |
| 2021/0109843 A1 * | 4/2021 | Datta | G06F 9/54 |
| 2021/0157622 A1 | 5/2021 | Ananthapur | |
| 2021/0271521 A1 | 9/2021 | Kang | |
| 2022/0035626 A1 * | 2/2022 | Kapoor | G06F 8/656 |

(Continued)

OTHER PUBLICATIONS

Kubernetes, "Kubernetes API Concepts"; retrieved from <https://kubernetes.io/docs/reference/using-api/api-concepts/> on Jan. 6, 2023; 17 pages.

(Continued)

*Primary Examiner* — Philip Wang
(74) *Attorney, Agent, or Firm* — TUCKER ELLIS LLP

(57) ABSTRACT

In accordance with an embodiment, described herein is a system and method for providing software rollouts within a controller-based container orchestration system. A super controller is responsible for launching and communicating with instance-scoped controllers for various software stack instances. Each software stack instance provides a specific instantiation of a software stack that has been deployed for a specific customer or tenant. The controllers allow a desired state of a system, such as a configuration or version of a software stack instance, to be declared via metadata, and then operate to realize the desired state into a live state. When applied to a cloud computing or containerized software environment that runs single-tenant workloads of many customers or tenants, a deployment process applies software updates in a safe, controlled manner, for example to control the pace of updating each of the several instances within a fleet.

20 Claims, 15 Drawing Sheets

(56) References Cited

U.S. PATENT DOCUMENTS

| | | | |
|---|---|---|---|
| 2022/0261277 A1 | | 8/2022 | Anand |
| 2022/0276848 A1* | | 9/2022 | Garaev ................. H04L 9/0894 |
| 2023/0004414 A1* | | 1/2023 | Lin ..................... H04L 41/0895 |
| 2023/0009930 A1* | | 1/2023 | Wang .................... G06F 9/4856 |
| 2023/0036657 A1 | | 2/2023 | Simone |

OTHER PUBLICATIONS

Kubernetes, "Custom Resources"; retrieved from <https://kubernetes.io/docs/concepts/extend-kubernetes/api-extension/custom-resources/> on Jan. 6, 2023; 7 pages.

Kubernetes, "Horizontal Pod Autoscaling"; retrieved from <https://kubernetes.io/docs/tasks/run-application/horizontal-pod-autoscale/> on Jan. 6, 2023; 9 pages.

Fansong, "How Does Alibaba Ensure the Performance of System Components in a 10,000-node Kubernetes Cluster", Nov. 12, 2019; retrieved from <https://alibaba-cloud.medium.com/how-does-alibaba-ensure-the-performance-of-system-components-in-a-10-000-node-kubernetes-cluster-ff0786cade32> on Jan. 6, 2023; 16 pages.

Singh, "How We Operate Kubernetes Multitenant Clusters in Public Cloud at Scale", Oct. 30, 2020; retrieved from <https://medium.com/salesforce-engineering/how-we-operate-kubernetes-multitenant-clusters-in-public-cloud-at-scale-548d9ca48d36> on Jan. 6, 2023; 2 pages.

Singh, "How Salesforce Operates Kubernetes Multitenant Clusters in Public Cloud at Scale", Oct. 30, 2020; retrieved from <https://vmblog.com/archive/2020/10/30/how-salesforce-operates-kubernetes-multitenant-clusters-in-public-cloud-at-scale.aspx#.Y7hjZBXMJaR> on Jan. 6, 2023; 4 pages.

Goyal, "Kubernetes Fundamentals", Aug. 17, 2020; retrieved from <https://medium.com/swlh/kubernetes-fundamentals-74f11b12f29c> on Jan. 6, 2023; 13 pages.

United States Patent and Trademark Office, Notice of Allowance and Fee(s) Due dated Jan. 30, 2023 for U.S. Appl. No. 17/390,691, 5 pages.

United States Patent and Trademark Office, Notice of Allowance and Fee(s) Due dated Oct. 6, 2022 for U.S. Appl. No. 17/390,691, 9 pages.

United States Patent and Trademark Office, Office Communication dated Mar. 17, 2022 for U.S. Appl. No. 17/390,691, 8 pages.

* cited by examiner

SYSTEM AND METHOD FOR PROVIDING SOFTWARE ROLLOUTS WITHIN A CONTROLLER-BASED CONTAINER ORCHESTRATION SYSTEM

TECHNICAL FIELD

Embodiments described herein are generally related to cloud computing, and containerized software environments, and are particularly directed to a system and method for providing software rollouts in such environments.

BACKGROUND

Within a cloud computing environment, a container orchestration system can be used to provide a runtime environment for containerized workloads and services that are deployed to the system as software stacks. Such an environment can support different types of software stacks that can be provided as services for use by the customers or tenants of the environment.

Each particular software stack may have an administrative entity or product team who is responsible for providing instances of that software stack. However, if the team deploys a new version of the controller associated with their software stack, this typically has the effect of immediately changing the expected state of all instances of the software stack within the environment.

For operational reasons such an immediate update of all software stack instances may not be preferred, and can lead to undesirable effects, including for example that the deployment of a problematic version may negatively impact all instances in current use, resulting in difficulties for a large number of customers.

SUMMARY

In accordance with an embodiment, described herein is a system and method for providing software rollouts within a controller-based container orchestration system. A super controller is responsible for launching and communicating with instance-scoped controllers for various software stack instances. Each software stack instance provides a specific instantiation of a software stack that has been deployed for a specific customer or tenant. The controllers allow a desired state of a system, such as a configuration or version of a software stack instance, to be declared via metadata, and then operate to realize the desired state into a live state. When applied to a cloud computing or containerized software environment that runs single-tenant workloads of many customers or tenants, a deployment process applies software updates in a safe, controlled manner, for example to control the pace of updating each of the several instances within a fleet.

DETAILED DESCRIPTION

Figure 1:
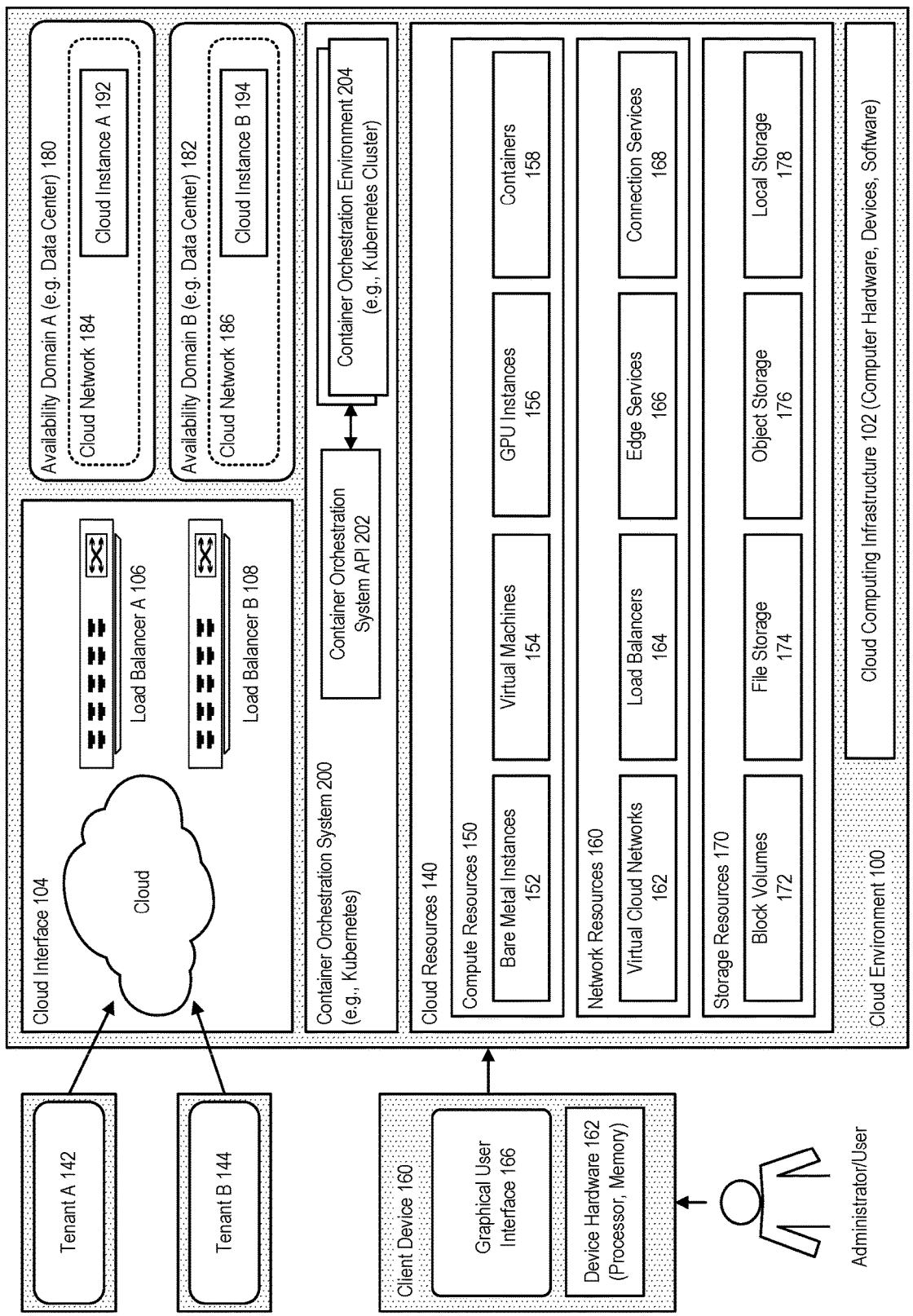
FIG. 1 illustrates an example cloud environment that includes a container orchestration system, in accordance with an embodiment.

Within a cloud computing environment, a container orchestration system can be used to provide a runtime environment for containerized workloads and services that are deployed to the system as software stacks. Such an environment can support different types of software stacks that can be provided as services for use by the customers or tenants of the environment.

Each particular software stack may have an administrative entity or product team who is responsible for providing instances of that software stack. However, if the team deploys a new version of the controller associated with their software stack, this typically has the effect of immediately changing the expected state of all instances of the software stack within the environment.

For operational reasons such an immediate update of all software stack instances may not be preferred, and can lead to undesirable effects, including for example that the deployment of a problematic version may negatively impact all instances in current use, resulting in difficulties for a large number of customers.

In accordance with an embodiment, described herein is a system and method for providing software rollouts within a controller-based container orchestration system.

In accordance with an embodiment, a super controller is responsible for launching and communicating with instance-scoped controllers for various software stack instances. Each software stack instance provides a specific instantiation of a software stack that has been deployed for a specific customer or tenant.

In accordance with an embodiment, the controllers allow a desired state of a system, such as a configuration or version of a software stack instance, to be declared via metadata, and then operate to realize the desired state into a live state. When applied to a cloud computing or containerized software environment that runs single-tenant workloads of many customers or tenants, a deployment process applies software updates in a safe, controlled manner, for example to control the pace of updating each of the several instances within a fleet.

In accordance with an embodiment, various technical advantages of the described approach can include, for example: the coordinated interaction between the Super Controller, Instance-Scoped Controller, Instance Metadata, and Deployment Process that achieves a safe and controllable rollout of software. This system provides insulation against a problematic code change simultaneously affecting all Instances in the Fleet.

In accordance with an embodiment, various details of a particular implementation or embodiment are provided below. The description is provided for the purposes of illustration and description. It is not intended to be exhaustive or to limit the scope of protection to the precise forms disclosed. Many modifications and variations will be apparent to the practitioner skilled in the art.

In accordance with an embodiment, various components, processes, and features are described herein, including:

Container Orchestration System

In accordance with an embodiment, a container orchestration system provides a runtime for containerized workloads and services. Examples of container orchestration systems can include Kubernetes, and Docker Swarm.

Container Orchestration Environment

In accordance with an embodiment, a container orchestration environment (environment) is an instance of a container orchestration system. For example, a specific Kubernetes cluster, or a specific Docker Swarm instance, are examples of (respectively Kubernetes, or Docker Swarm) container orchestration environments.

Container Orchestration Implementation

In accordance with an embodiment, a container orchestration implementation (referred to herein in some embodiments as a container orchestration vendor, or vendor) is an implementation provider for a particular type of container orchestration system.

Examples of container orchestration implementations include Oracle Container Engine for Kubernetes (OKE), and Amazon Elastic Kubernetes Service (EKS), both of which provide container orchestration implementations (i.e., are vendors) for Kubernetes.

Node

In accordance with an embodiment, a node can be an individual bare metal machine or virtual machine (VM), to which containers are scheduled to run within a container orchestration environment, for example as part of a Kubernetes cluster or Docker Swarm instance.

Node Labels

In accordance with an embodiment, node labels can be represented as key-value pairs that are associated with each node in the container orchestration environment. Supported container orchestration systems provide the ability to associate node labels with nodes, wherein such labels can indicate, for example: (a) one or more fault domain(s) in which the node is running; and (b) a date or time at which the node was created.

Fault Domain

In accordance with an embodiment, a fault domain is a group of nodes that share some physical infrastructure. For example, a particular node can be associated with one more fault domains, examples of which may include regions (e.g., a geographical area, such as a city), availability zones (partitioning within a region with dedicated power and cooling), or other fine-grained partitioning of a physical infrastructure (e.g., a semi-isolated rack within a data center).

Application Workload

In accordance with an embodiment, an application workload is a custom application that has been deployed within a container orchestration environment.

Software Stack

In accordance with an embodiment, a software stack is a collection of software components deployed together as a collection of containers.

Software Stack Instance

In accordance with an embodiment, a software stack instance is a specific instantiation of a software stack that has been deployed for a specific customer or tenant. Each software stack instance is single-tenant-containers or data from a particular software stack instance are not shared with another software stack instance.

Fleet

In accordance with an embodiment, a fleet is collection of software stack instances running on a particular container orchestration system. A container orchestration system can be managed by a central product team (the owning team), as a multi-tenant environment that runs software stack instances for a plurality of customer or tenants.

Owning Team

In accordance with an embodiment, an owning team is an administrative entity or product team responsible for maintaining and running the container orchestration system and the software that runs on it.

Metadata

In accordance with an embodiment, as referred to herein metadata is a lightweight configuration data that is stored in the container orchestration environment itself. Metadata can be retrieved and watched by a controller acting on the container orchestration environment. Supported container orchestration systems provide the ability to read and write the metadata associated with their container orchestration environments.

Instance Metadata

In accordance with an embodiment, an instance metadata describes an expected configuration state of a particular instance, in a format that is understood by the controller. All instance metadata resides within the container orchestration system itself.

Instance Metadata—Versioning

In accordance with an embodiment, the instance metadata format can be augmented to include fields associated with specifying a configuration or version to be used with a software stack instance, for example:

desiredVersion—the controller version intended to be used for this instance currentVersion—the controller version that is currently being used for this instance Instance Metadata—Ring In accordance with an embodiment, the instance metadata format can be augmented to include fields associated with specifying a relative importance of a particular instance with respect to other instances in a fleet, referred to herein in some examples as a ring value. When used as part of a software deployment process, the higher the ring value, the later the instance will be updated in the deployment flow. All instances in a given ring will be guaranteed to be fully and successfully processed before proceeding to the next ring. The range of ring values can be from 0 to some arbitrary maximum.

Controller

In accordance with an embodiment, a controller is a software component or a process of the container orchestration system that watches a container orchestration environment for events and state changes, and then performs some action as a result. The controller uses one or more application program interfaces (API) provided by the container orchestration system for both the event watching and to take any action within the container orchestration environment. For example, the controller watches the container orchestration system for available instance metadata, and realizes the expected state of the implied instance, including containers and other container orchestration system primitives.

Instance-Scoped Controller

In accordance with an embodiment, an instance-scoped controller is a controller run per instance. Each instance-scoped controller is limited in scope: only watching and acting upon one particular instance. An instance-scoped controller is also responsible for performing health/readiness checks against the instance, and verifying that the instance has been successfully updated in accordance with whichever criteria that means for the software stack in question). Once its instance's components are fully running and healthy, the instance-scoped controller updates the instance's metadata currentVersion to the value of its desiredVersion.

Super Controller

In accordance with an embodiment, a super controller is a controller that is responsible for launching the instance-scoped controllers for the various software stack instances. The super controller watches instance metadata for all instances in current use, and ensures an instance-scoped controller is launched for each, based on its desiredVersion field. One super controller is run for the entirety of the container orchestration system.

Controller Version

In accordance with an embodiment, a controller version refers to a specific version of the code of the controller, wherein a new version of a controller may bring about a new expected state of instances.

Controller Pattern

In accordance with an embodiment, a controller pattern is the design pattern of using a controller to realize the expected state of instances based on instance metadata.

Deployment Process

In accordance with an embodiment, a deployment process is the process by which the owning team updates the controller.

Containerized (Cloud) Environments

FIG. 1 illustrates an example cloud environment that includes a container orchestration system, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment within which a container orchestration system can be used to support application workloads. In accordance with other embodiments, the various components, processes, and features described herein can be used with other types of container orchestration systems, or other types of computing environments.

As illustrated in FIG. 1, in accordance with an embodiment, a cloud computing environment (cloud environment) 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108.

In accordance with an embodiment, the cloud environment supports the use of availability domains, such as for example availability domains A 180, and availability domains A B 182, which enables customers to create and access cloud networks 184, 186, and run cloud instances A 192, B 194.

In accordance with an embodiment, a tenancy can be created for each cloud customer or tenant, for example tenant A 142, B 144, which provides a secure and isolated partition within the cloud environment within which the customer can create, organize, and administer their cloud resources. A cloud customer or tenant can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator or other user to communicate with the cloud computing environment via a network such as, for example, a wide area network, local area network, or the Internet, to create or update cloud services.

In accordance with an embodiment, the cloud environment provides access to shared cloud resources 140 via, for example, a compute resources layer 150, a network resources layer 160, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud environment can be used to provide control of physical host ("bare metal") machines within the compute resources layer, which run as compute cloud instances directly on bare metal servers, without a hypervisor.

In accordance with an embodiment, the cloud environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 162, load balancers 164, edge services 166, and/or connection services 168.

In accordance with an embodiment, the storage resources layer can comprise a number of resources, such as, for example, data/block volumes 172, file storage 174, object storage 176, and/or local storage 178.

In accordance with an embodiment, the cloud environment can include a container orchestration system 200, and container orchestration system API 202, that enables containerized application workflows to be deployed to a container orchestration environment 204, for example a Kubernetes cluster.

For example, in accordance with an embodiment, the cloud environment can be used to provide containerized compute cloud instances within the compute resources layer, and a container orchestration implementation (e.g., OKE), can be used to build and launch containerized applications or cloud-native applications, specify compute resources that the containerized application requires, and provision the required compute resources.

Containerized Workflows

Figure 2:
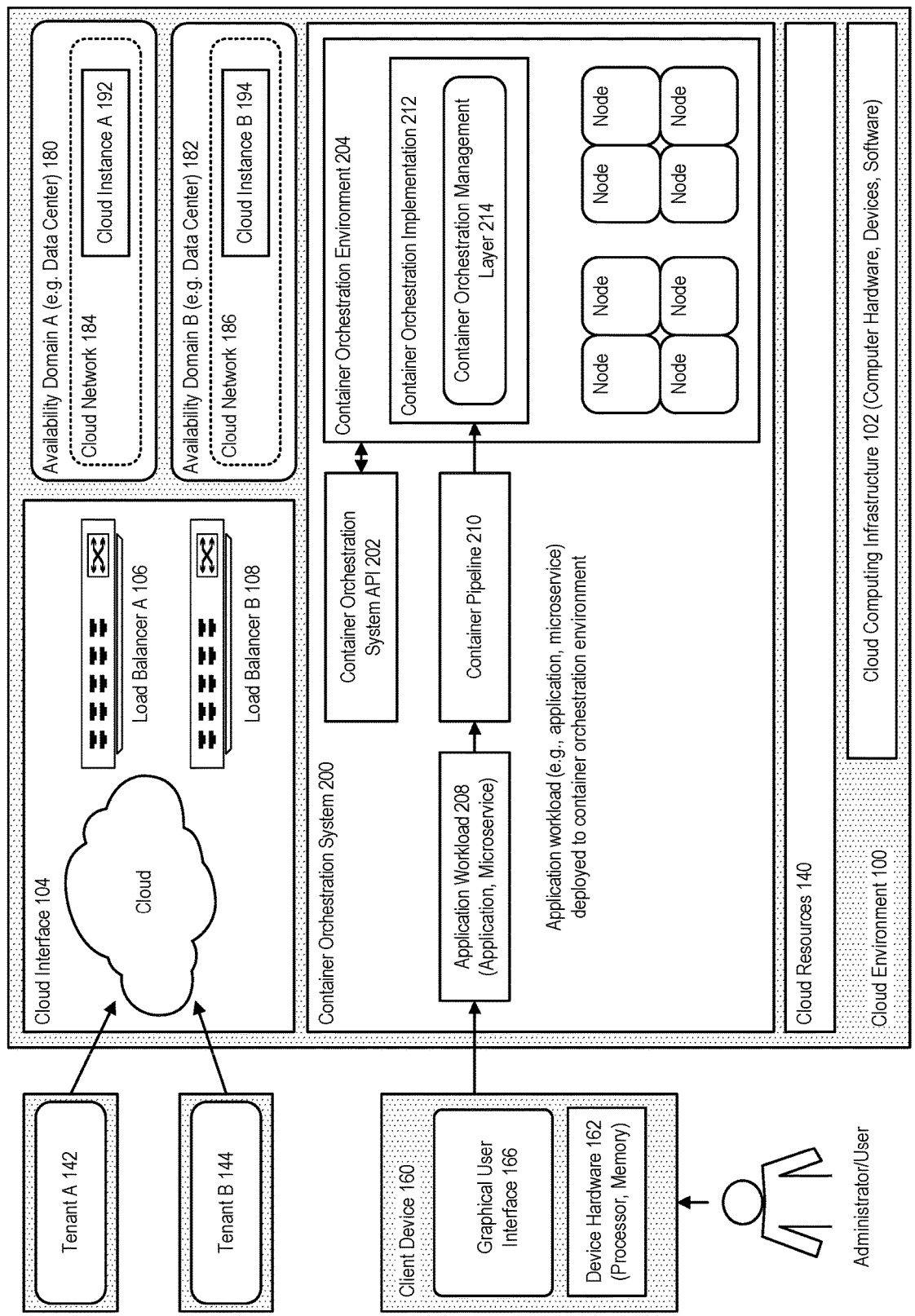
FIG. 2 further illustrates the use of a container orchestration system, in accordance with an embodiment.
Figure 3:
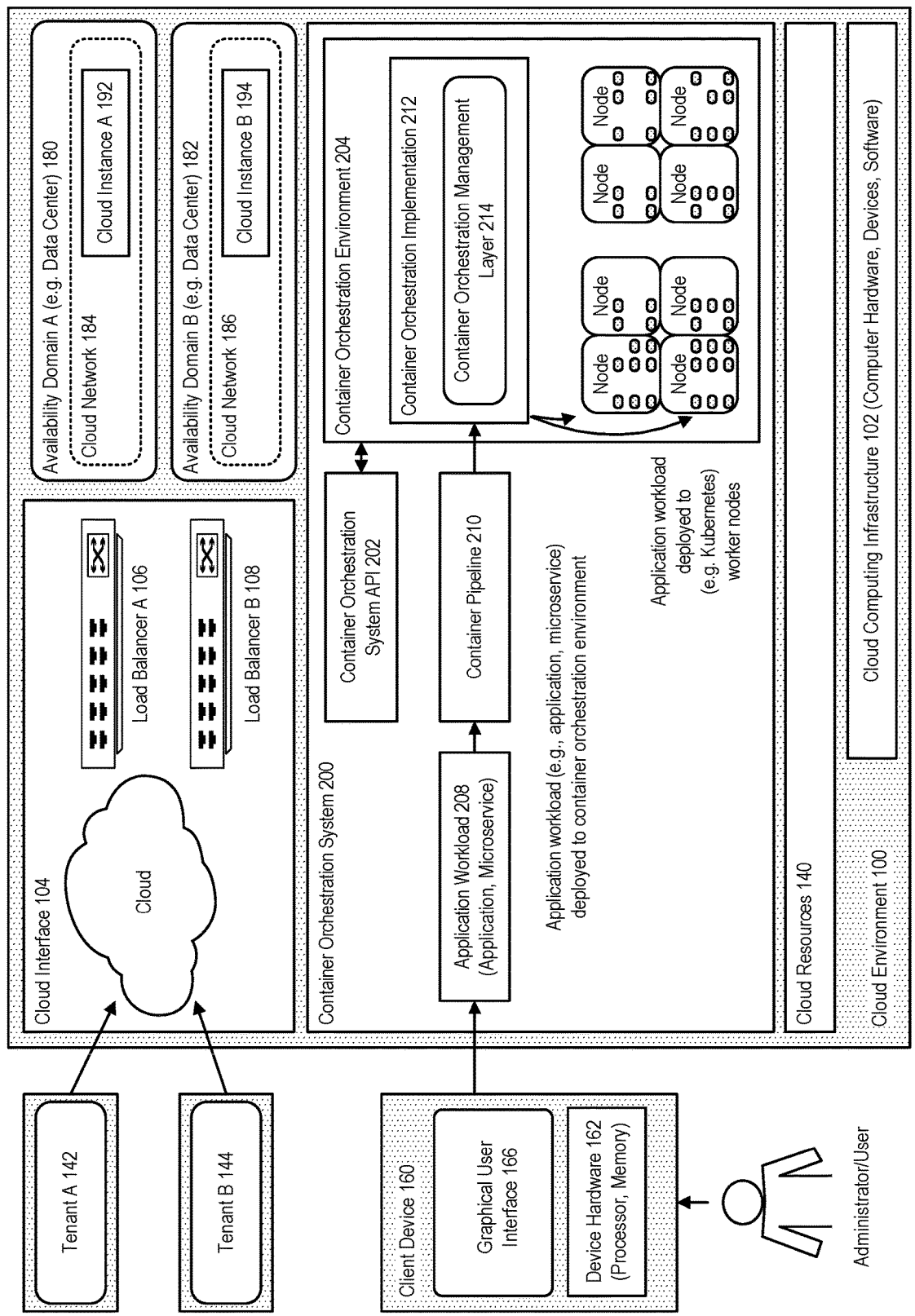
FIG. 3 further illustrates the use of a container orchestration system, in accordance with an embodiment.
Figure 4:
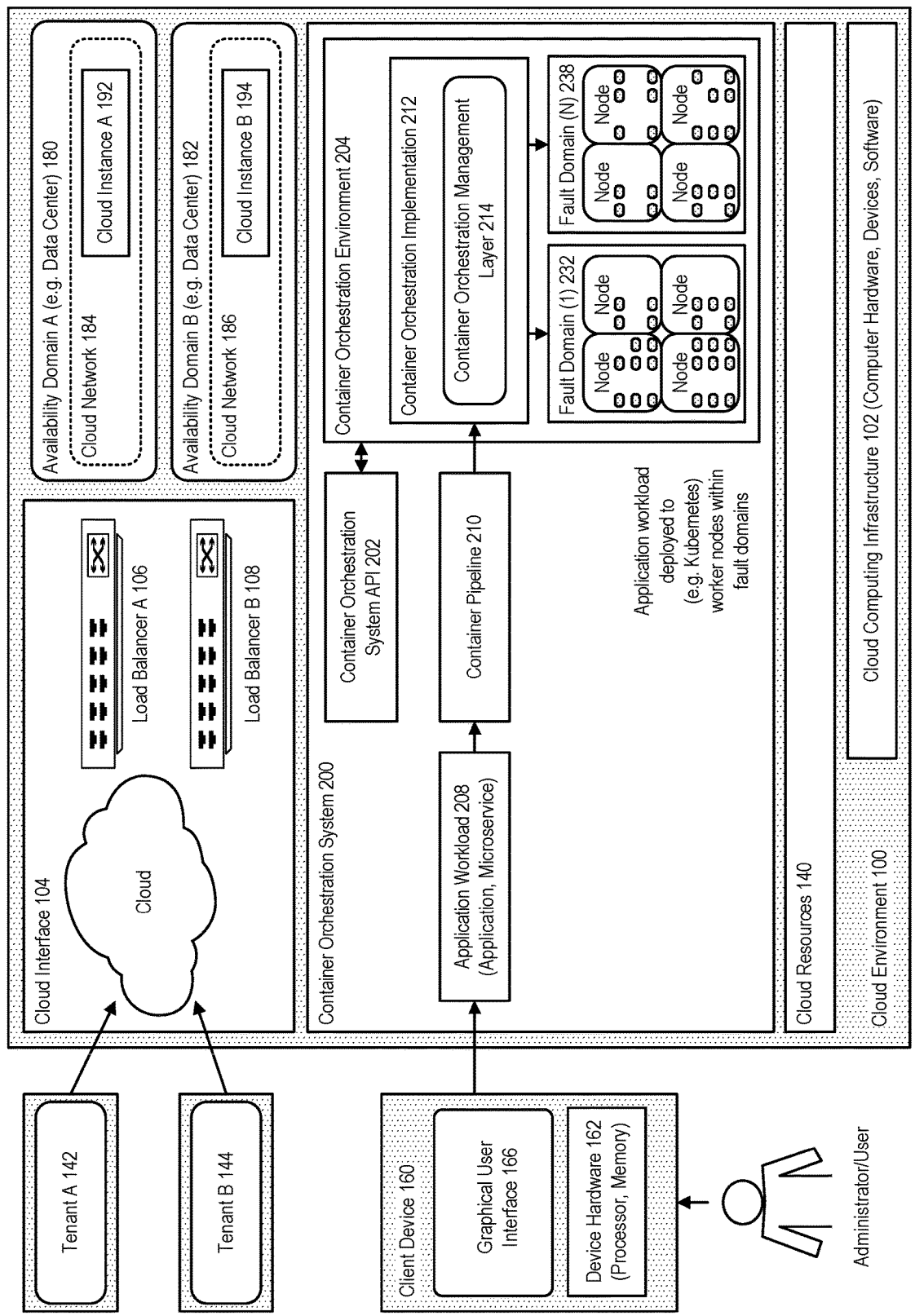
FIG. 4 further illustrates the use of a container orchestration system, in accordance with an embodiment.

FIGS. 2-4 further illustrate the use of a container orchestration system, in accordance with an embodiment.

As illustrated in FIG. 2, in accordance with an embodiment, the container orchestration system enables an application workload 208 (e.g., an application, or microservice) to be deployed to the environment, via a container pipeline 210. The container orchestration implementation (vendor) 212 provides a container orchestration management layer 214 adapted to schedule application workload containers to run on various nodes.

As illustrated in FIG. 3, in accordance with an embodiment, an application workload can be deployed to a plurality of (e.g., Kubernetes) worker nodes.

As illustrated in FIG. 4, in accordance with an embodiment, the container orchestration environment is adapted to assign and launch containerized workloads to select nodes, including in some environments to fault domains 232,238 (i.e., groups of nodes that share some physical infrastructure).

Software Rollouts to Containerized Environments

As described above, within a cloud computing environment, each particular software stack may have an administrative entity or product team who is responsible for providing instances of that software stack. However, if the team deploys a new version of the controller associated with their software stack, this typically has the effect of immediately changing the expected state of all instances of the software stack within the environment; which can lead to undesirable effects.

In accordance with an embodiment, a container orchestration system supports a controller-based deployment process, wherein a super controller is responsible for launching and communicating with instance-scoped controllers for various software stack instances. Each software stack instance provides a specific instantiation of a software stack that has been deployed for a specific customer or tenant. The controllers allow a desired state of a system, such as a configuration or version of a software stack instance, to be declared via metadata, and then operate to realize the desired state into a live state. When applied to a cloud computing or containerized software environment that runs single-tenant workloads of many customers or tenants, a deployment process applies software updates in a safe, controlled manner, for example to control the pace of updating each of the several instances within a fleet.

Figure 5:
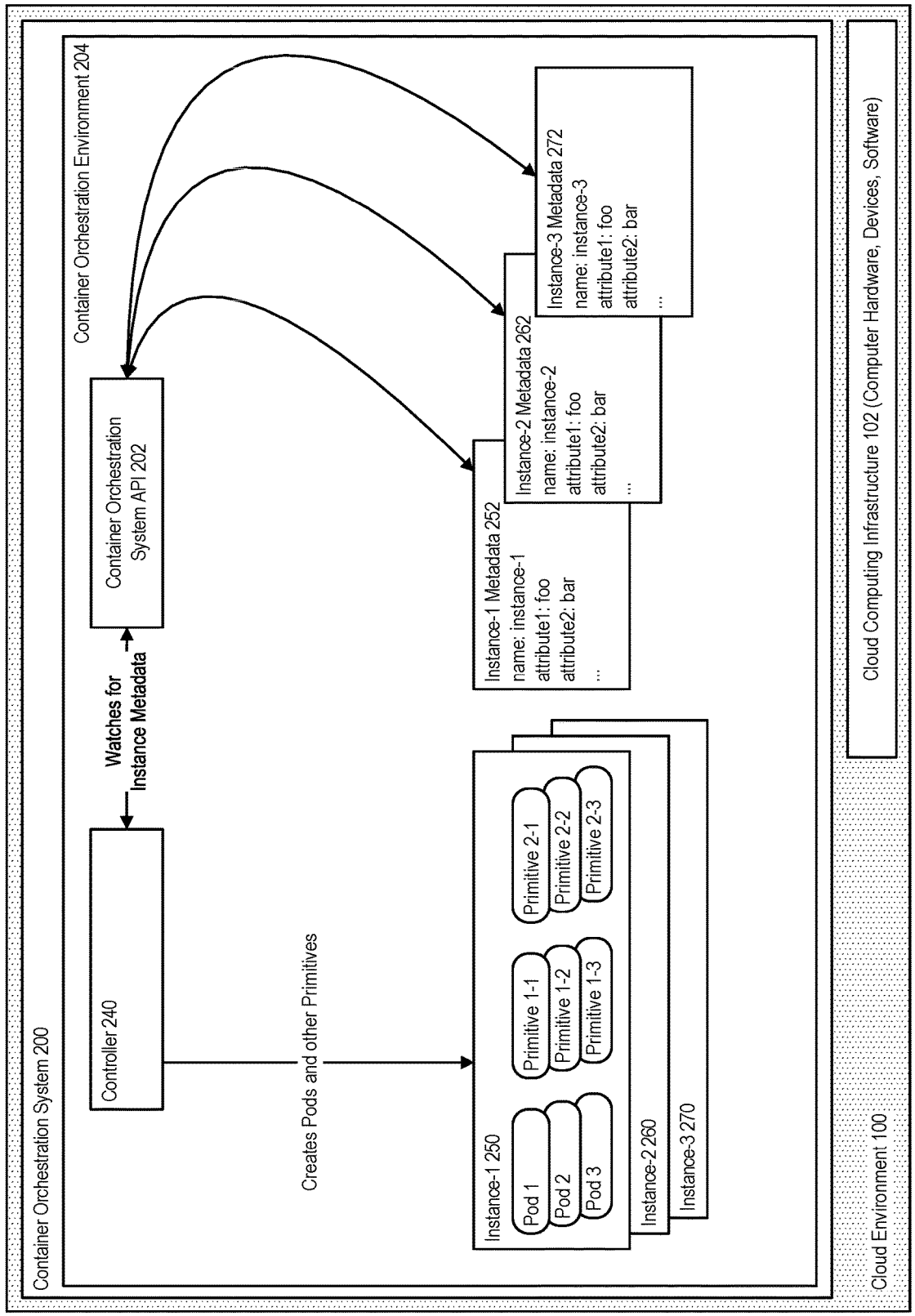
FIG. 5 illustrates the use of controllers with a container orchestration system, in accordance with an embodiment.

FIG. 5 illustrates the use of controllers with a container orchestration system, in accordance with an embodiment.

As illustrated in FIG. 5, in accordance with an embodiment, a controller 240 is a software component or a process of the container orchestration system that watches a container orchestration environment for events and state changes, and then performs some action as a result. The controller uses one or more application program interfaces (API) provided by the container orchestration system for both the event watching and to take any action within the container orchestration environment. For example, the controller watches the container orchestration system for available instance metadata 252, 262, 272, and realizes the expected state of the implied instance 250, 260, 270, including containers and other container orchestration system primitives.

In accordance with an embodiment, the container orchestration system can be provided as a Kubernetes system, or other type of container orchestration system. A software stack can include a set of logging and monitoring products such as, for example, Grafana, Prometheus, Elasticsearch, and Kibana components. A unique instance of this stack can be provided for each of a plurality of customers or tenants, and deployed to the same Kubernetes cluster.

Figure 6:
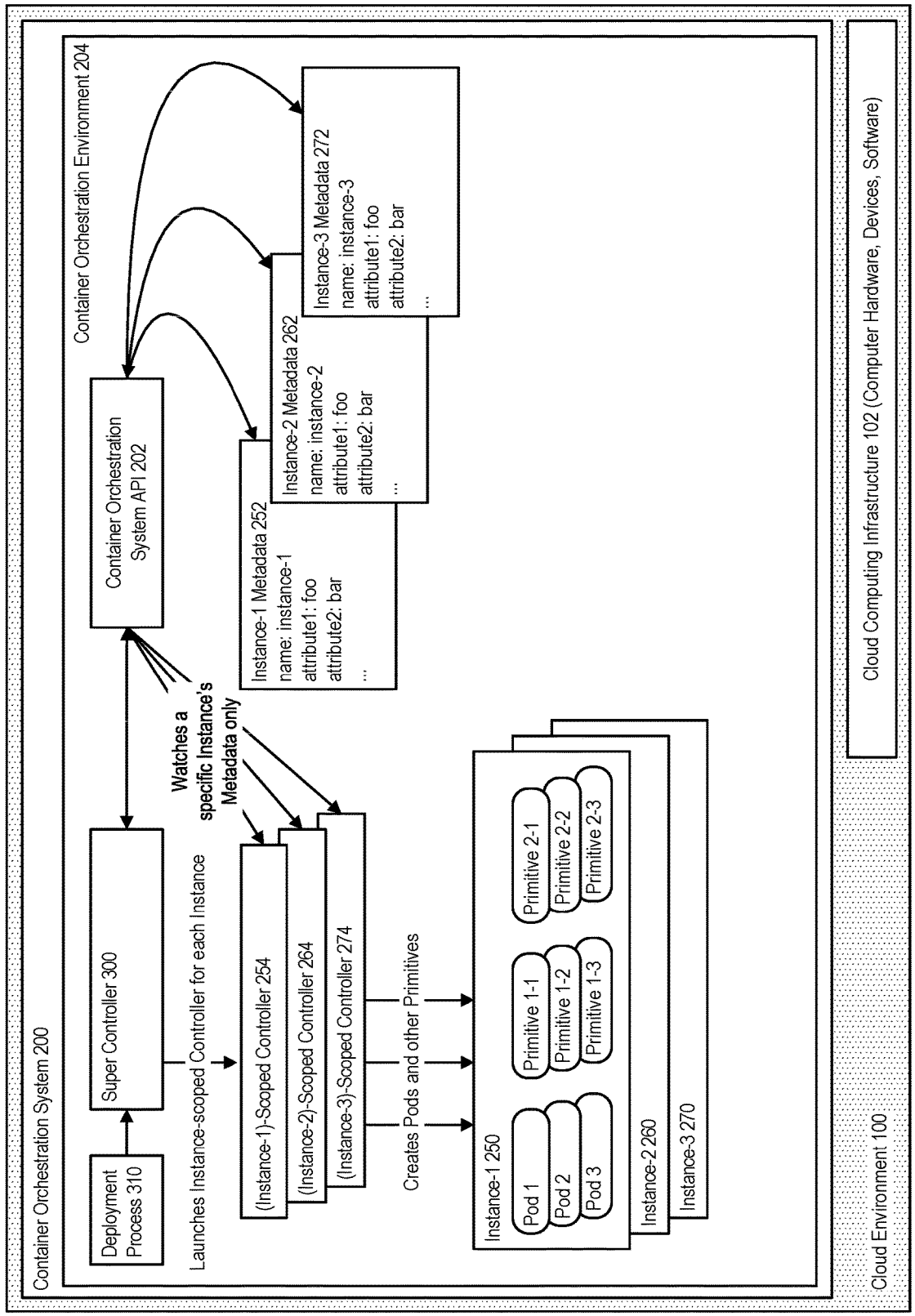
FIG. 6 illustrates the use of a super controller for providing software rollouts within a container orchestration system, in accordance with an embodiment.

FIG. 6 illustrates the use of a super controller for providing software rollouts within a container orchestration system, in accordance with an embodiment.

As illustrated in FIG. 6, in accordance with an embodiment, an instance-scoped controller 254, 264, 274 is a controller run per instance. Each instance-scoped controller is limited in scope: only watching and acting upon one particular instance. An instance-scoped controller is also responsible for performing health/readiness checks against the instance, and verifying that the instance has been successfully updated in accordance with whichever criteria that means for the software stack in question). Once its instance's components are fully running and healthy, the instance-scoped controller updates the instance's metadata currentVersion to the value of its desiredVersion.

In accordance with an embodiment, a super controller 300 is a controller that is responsible for launching the instance-scoped controllers for the various software stack instances. The super controller watches instance metadata for all instances in current use, and ensures an instance-scoped controller is launched for each, based on its desiredVersion field. One super controller is run for the entirety of the container orchestration system.

For example, in accordance with an embodiment that uses Kubernetes, a custom instance metadata can be provided via a Kubernetes CustomerResources. For example, a Kubernetes CustomerResourceDefinition can be defined in a Kubernetes cluster, to provide a custom metadata schema that defines various aspects such as the size and shape of a particular customer's instance (e.g., the number of replicas of various components, or storage size). An instance of this schema, i.e., a CustomResource, can then be created to represent each of our customer instances.

For example, in accordance with an embodiment that uses Kubernetes, controllers can be provided or built with Golang, using the Kubernetes APIs, packaged as Docker containers, and deployed into the Kubernetes cluster. The controllers can use the Kubernetes-provided event watching APIs to watch and discover CustomResource instances; based on the CustomResource instances discovered, the controller creates Kubernetes primitives (e.g., deployments, services, and ingresses) to realize those functions the CustomResource is trying to express.

For example, in accordance with an embodiment that uses Kubernetes, an instance-scoped controller can operate to discover a CustomResource in a particular Kubernetes namespace, and create the underlying deployments (e.g., services, and ingresses), to realize the logging/monitoring stack for that customer, with the appropriate settings (e.g., size, or shape).

Figure 7:
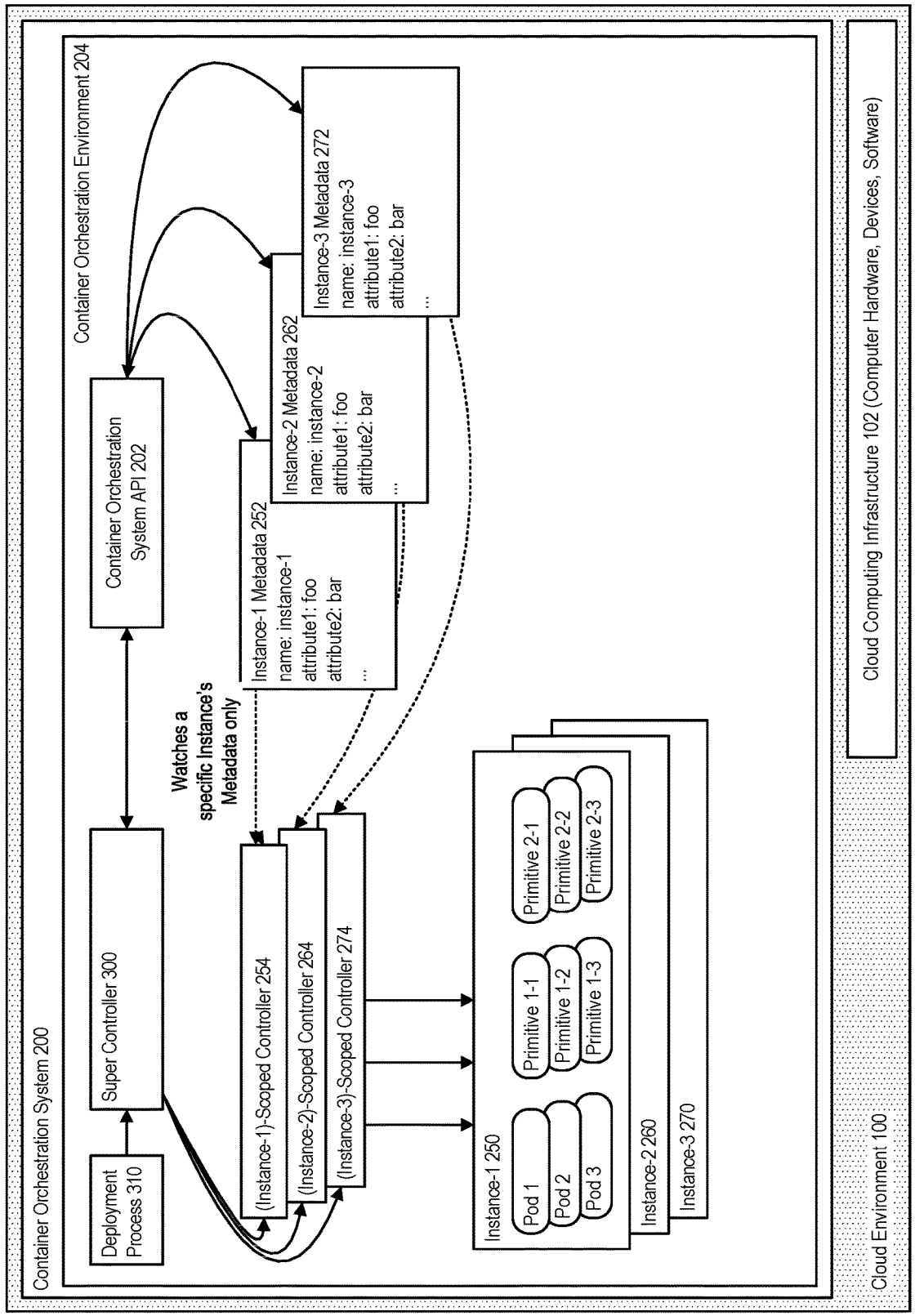
FIG. 7 further illustrates the use of a super controller for providing software rollouts within a container orchestration system, in accordance with an embodiment.

FIG. 7 further illustrates the use of a super controller for providing software rollouts within a container orchestration system, in accordance with an embodiment.

As illustrated in FIG. 7, in accordance with an embodiment, an instance metadata describes an expected configuration state of a particular instance, in a format that is understood by the controller. All instance metadata resides within the container orchestration system itself.

For example, in accordance with an embodiment that uses Kubernetes, a super controller can operate to discover CustomResource instances in the cluster and for each instance, realize the deployment of an instance-scoped controller with the correct version and container, as indicated in the CustomResources's desiredVersion field.

Figure 8:
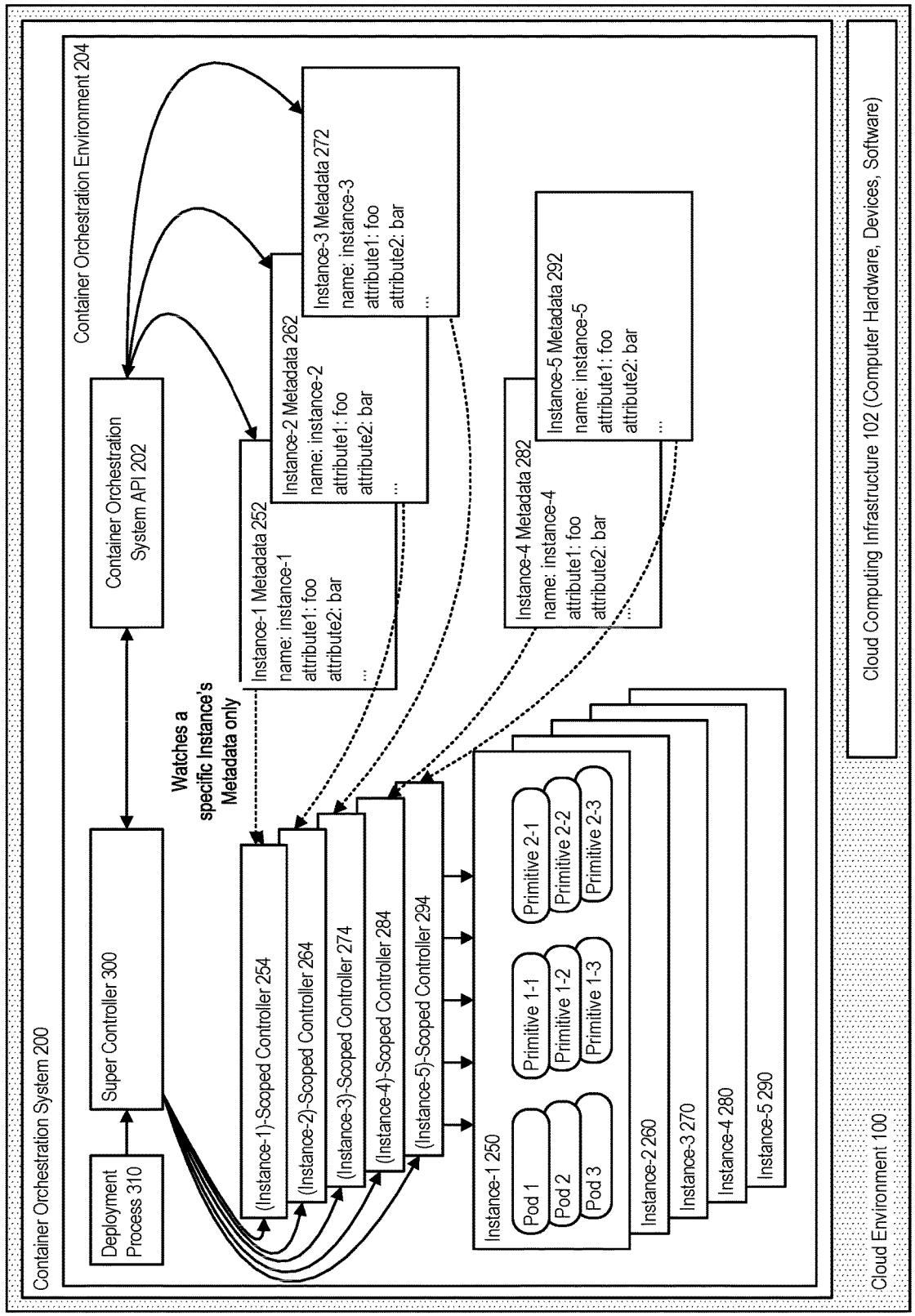
FIG. 8 further illustrates the use of a super controller for providing software rollouts within a container orchestration system, in accordance with an embodiment.
Figure 9:
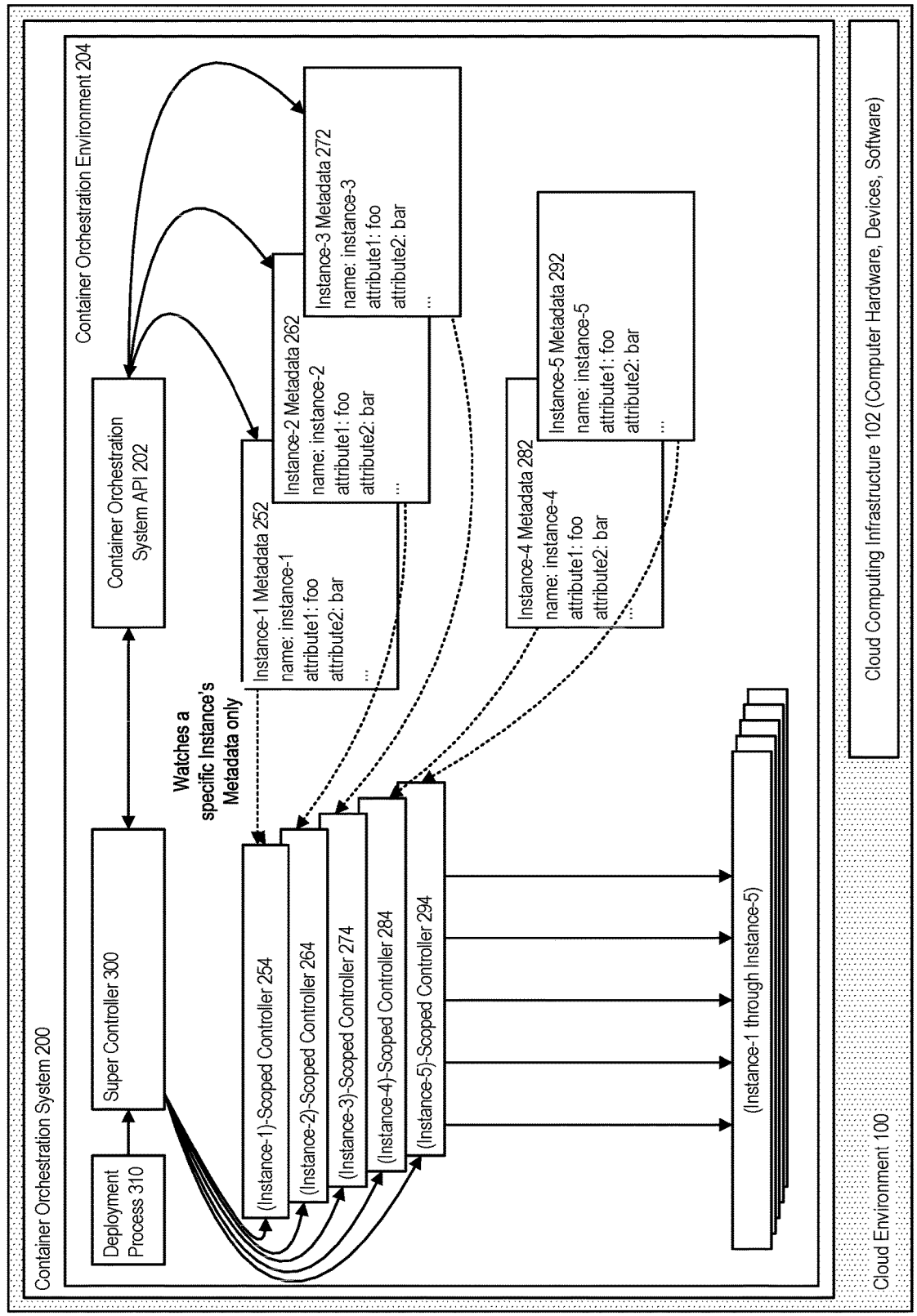
FIG. 9 further illustrates the use of a super controller for providing software rollouts within a container orchestration system, in accordance with an embodiment.

FIGS. 8-9 further illustrate the use of a super controller for providing software rollouts within a container orchestration system, in accordance with an embodiment.

As illustrated in FIGS. 8-9, in accordance with an embodiment, additional instance-scoped controllers 284, 294 can be provided for additional instances 280, 290, and instance metadata 282, 292.

Figure 10:
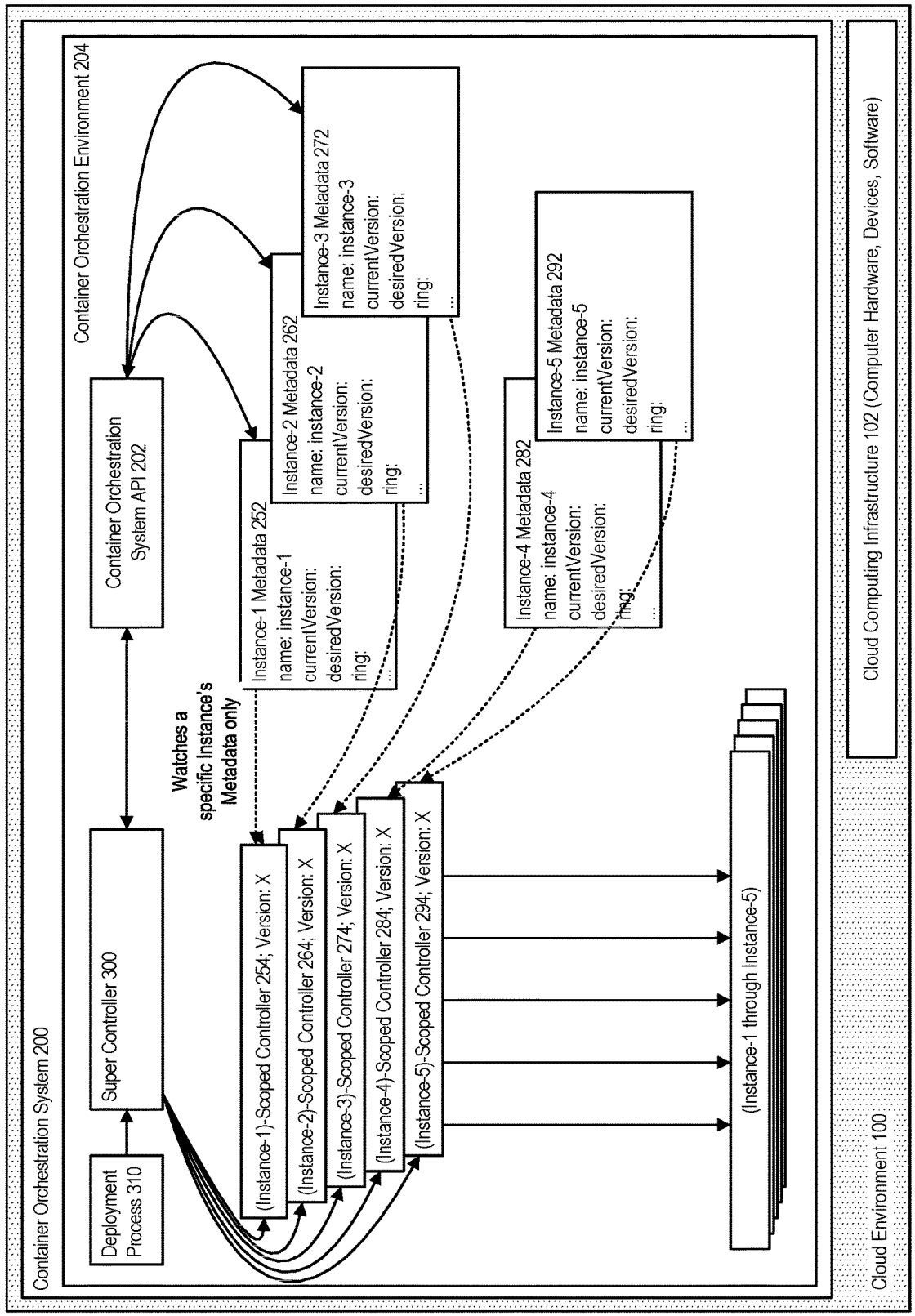
FIG. 10 further illustrates the use of a super controller for providing software rollouts within a container orchestration system, in accordance with an embodiment.

FIG. 10 further illustrates the use of a super controller for providing software rollouts within a container orchestration system, in accordance with an embodiment.

As illustrated in FIG. 10, in accordance with an embodiment, the instance metadata format can be augmented to include fields associated with specifying a configuration or version to be used with a software stack instance, for example: a desiredVersion—the controller version intended to be used for this instance; and a currentVersion—the controller version that is currently being used for this instance.

In accordance with an embodiment, the instance metadata format can be augmented to include fields associated with specifying a relative importance of a particular instance with respect to other instances in a fleet, referred to herein in some examples as a ring value. When used as part of a software deployment process 310, the higher the ring value, the later the instance will be updated in the deployment flow. All instances in a given ring will be guaranteed to be fully and successfully processed before proceeding to the next ring. The range of ring values can be from 0 to some arbitrary maximum.

Figure 11:
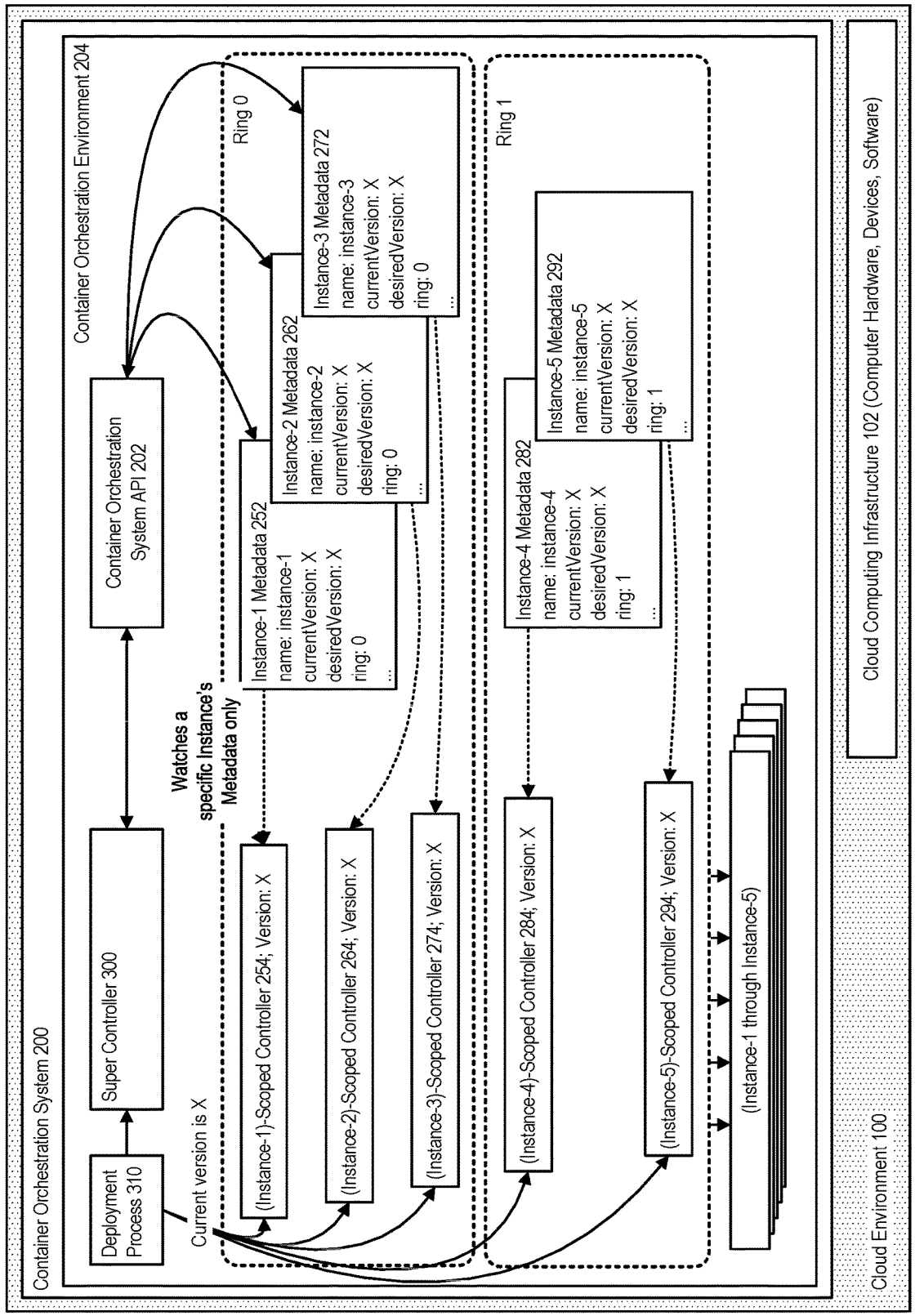
FIG. 11 further illustrates the use of a super controller for providing software rollouts within a container orchestration system, in accordance with an embodiment.

FIG. 11 further illustrates the use of a super controller for providing software rollouts within a container orchestration system, in accordance with an embodiment.

As illustrated in FIG. 11, in accordance with an embodiment, during a first phase the deployment process updates the version of the super controller. No instance-scoped controllers (and by relation, instances) are modified yet by this first phase of the deployment process; which addresses the potentially negative effects of a process that updates the version of a single controller and has the effect of immediately taking action on all instances in the fleet.

Figure 12:
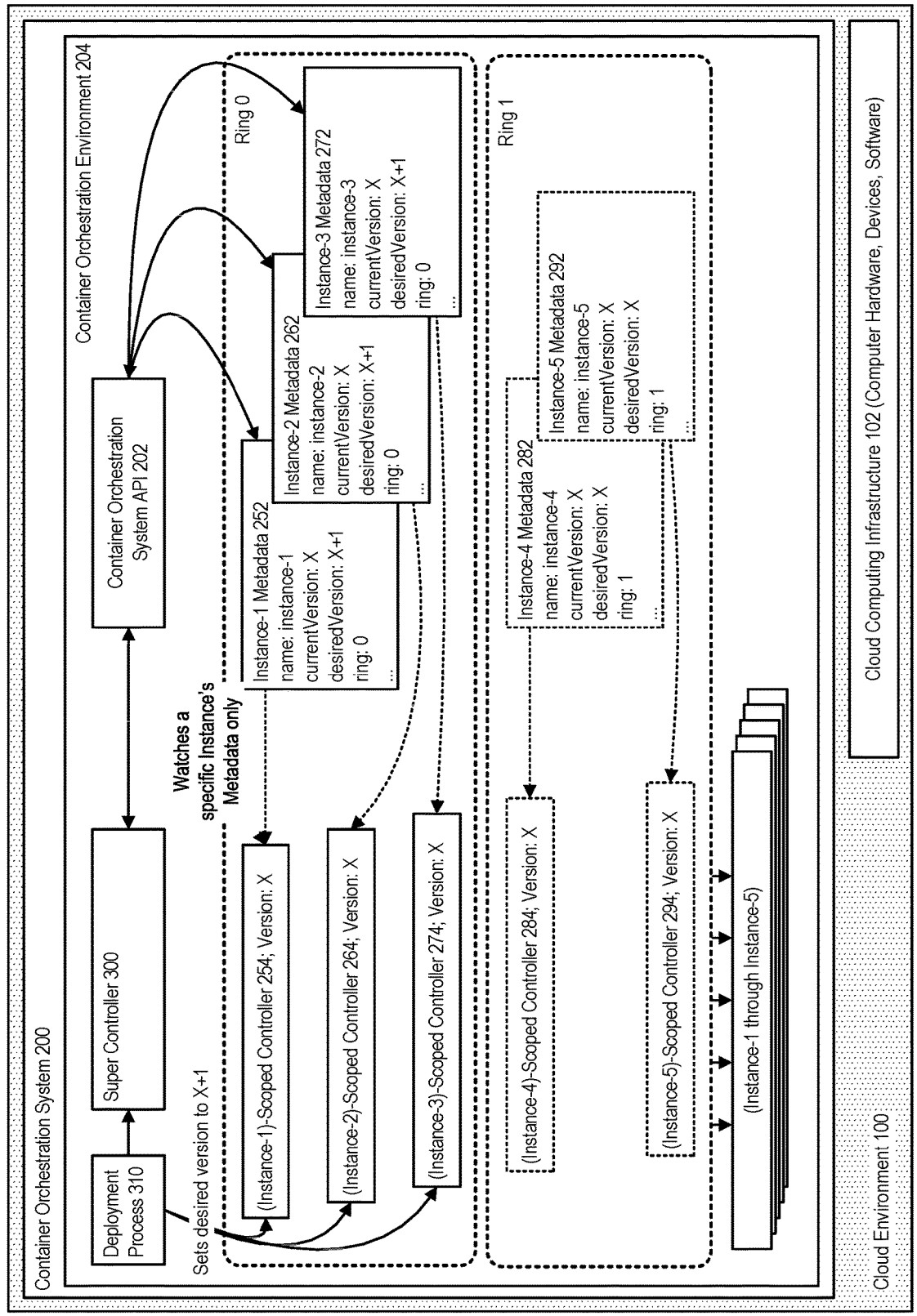
FIG. 12 further illustrates the use of a super controller for providing software rollouts within a container orchestration system, in accordance with an embodiment.
Figure 13:
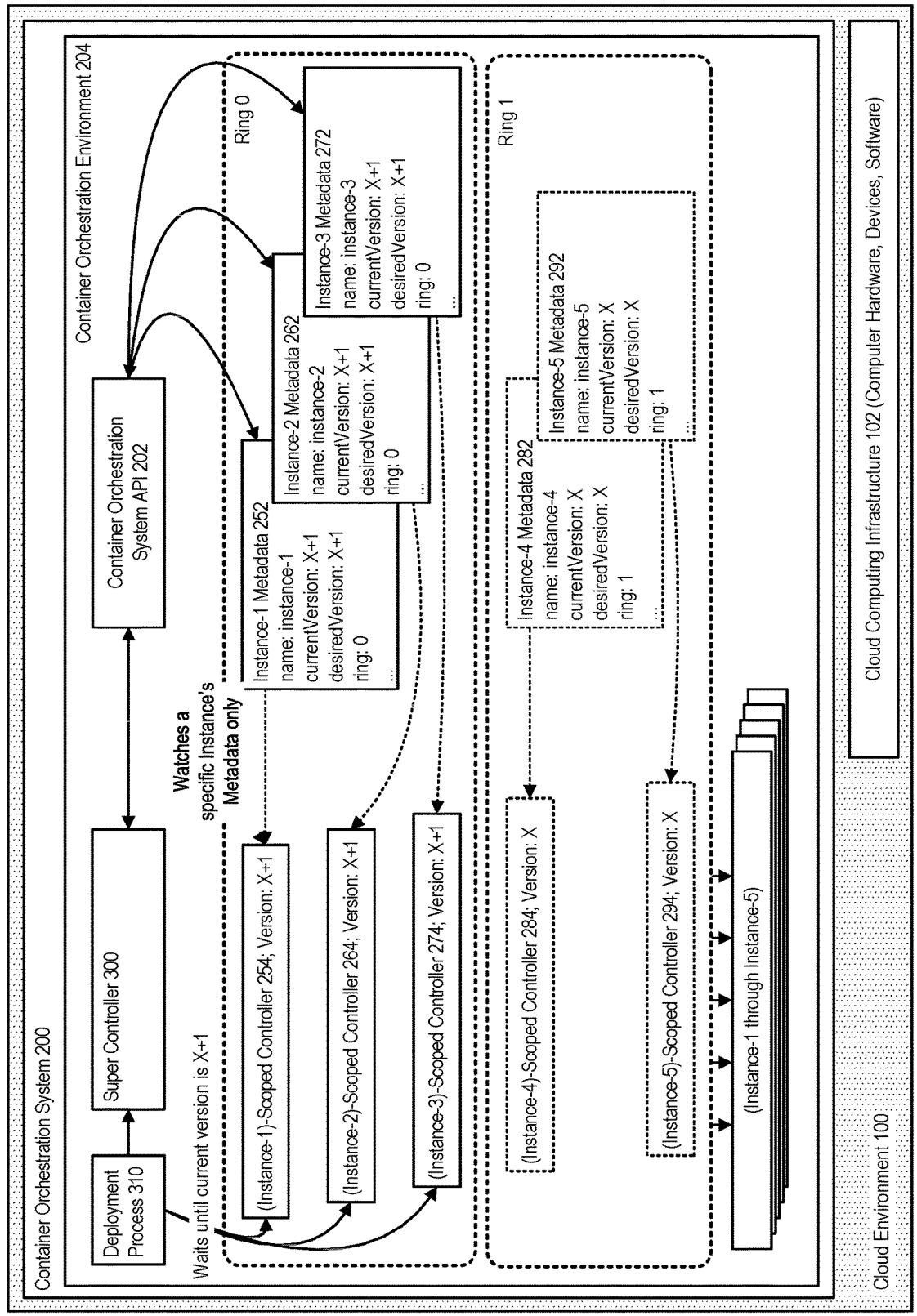
FIG. 13 further illustrates the use of a super controller for providing software rollouts within a container orchestration system, in accordance with an embodiment.

FIGS. 12-13 further illustrates the use of a super controller for providing software rollouts within a container orchestration system, in accordance with an embodiment.

As illustrated in FIGS. 12-13, in accordance with an embodiment, a subsequent phase of the deployment process gradually updates the version of all instances, for example, to update a previously deployed version X of the controller/instance, and attempting to deploy an updated version X+1.

The process is continued until all instances of the current ring have been fully processed. Upon completion of the process, the fleet has been fully updated to the new version of the software.

Figure 14:
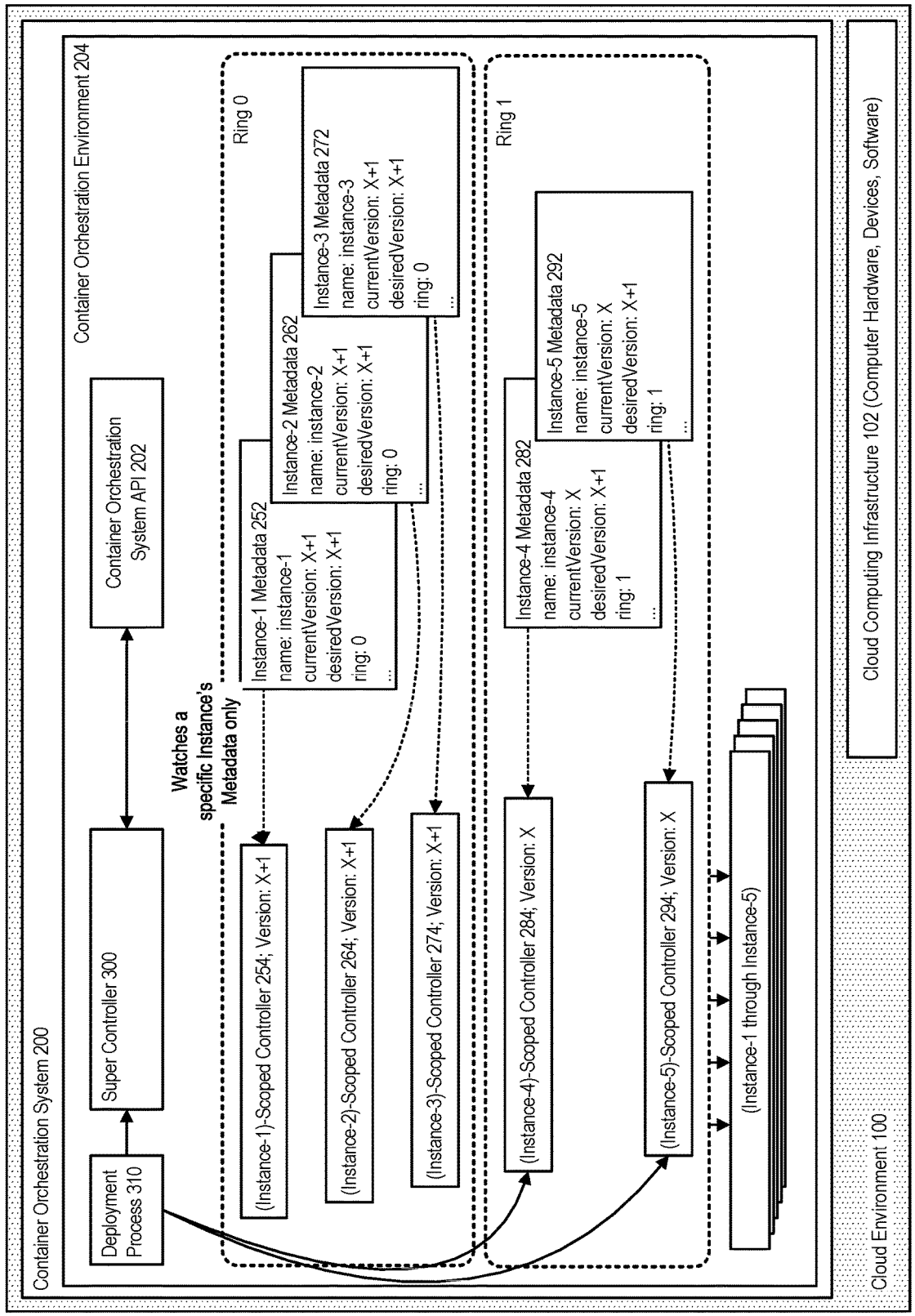
FIG. 14 further illustrates the use of a super controller for providing software rollouts within a container orchestration system, in accordance with an embodiment.

FIG. 14 further illustrates the use of a super controller for providing software rollouts within a container orchestration system, in accordance with an embodiment.

As illustrated in FIG. 14, in accordance with an embodiment, a similar deployment process can be used to update other rings.

Deployment Process

Figure 15:
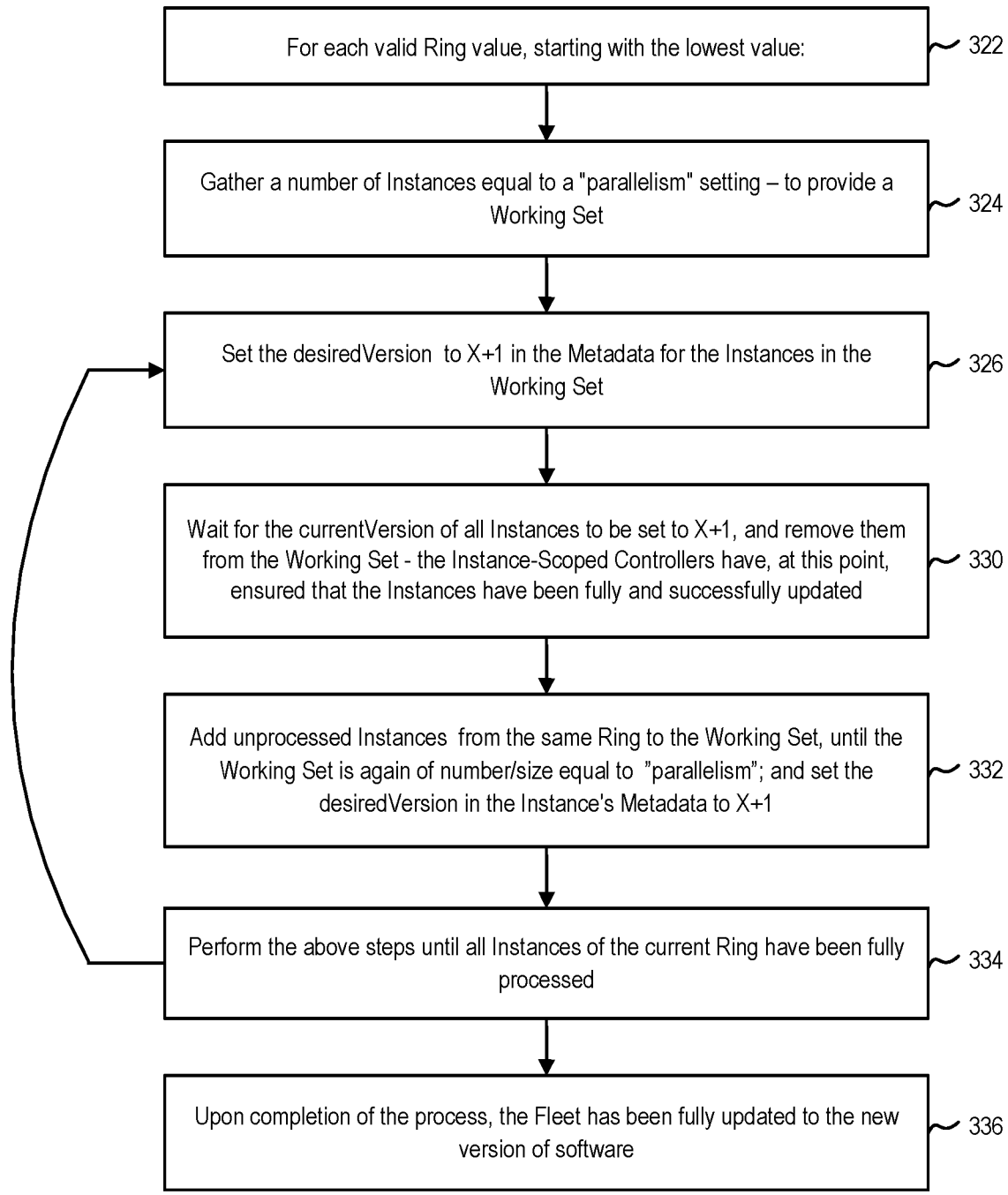
FIG. 15 illustrates a process for the use of a super controller in providing software rollouts within a container orchestration system, in accordance with an embodiment.

FIG. 15 illustrates a process for the use of a super controller in providing software rollouts within a container orchestration system, in accordance with an embodiment.

In accordance with an embodiment, during a first phase the deployment process updates the version of the super controller. No instance-scoped controllers (and by relation, instances) are modified yet by this first phase of the deployment process; which addresses the potentially negative effects of a process that updates the version of a single controller and has the effect of immediately taking action on all instances in the fleet.

A subsequent phase of the deployment process gradually updates the version of all instances, for example, to update a previously deployed version X of the controller/instance, and attempting to deploy an updated version X+1.

In accordance with an embodiment, a "parallelism" setting is provided for use in the deployment process implementation. This will limit how many instances can be updated simultaneously. This parallelism setting may be set by the owning team to different values for different software releases, based on the perceived risk of the change in question.

As illustrated in FIG. 15, in accordance with an embodiment, the deployment process includes, at step 322, for each valid ring value, starting with the lowest value:

At step 324, gather a number of instances equal to the "parallelism" setting; this provides a working set.

At step 326, set the desiredVersion to X+1 in the metadata for the instances in the working set.

At step 330, the system waits for the currentVersion of all Instances to be set to X+1, and remove them from the Working Set—the Instance-Scoped Controllers have, at this point, ensured that the Instances have been fully and successfully updated.

At step 332, unprocessed instances are added from the same ring to the working set, until the working set is again of size "parallelism". Set the desired Version in the instance's metadata to X+1.

At step 334, the process is continued until all instances of the current ring have been fully processed.

At step 336, upon completion of the process, the fleet has been fully updated to the new version of the software.

Error Handling

In accordance with an embodiment, an instance that fails in some way will not have its currentVersion updated to X+1, because it will not pass the verification steps of its instance-scoped controller. Some reasonable timeout value should be set within the deployment process, after which time the deployment process determines that an instance's update has failed, and aborts. At this point, the owning team must step in to investigate what went wrong.

As illustrated above, the rings can be used by the system to insulate the effect of failures: for example, a failure to process an instance in ring R can be used to prevent processing of instances in rings>R; while not preventing processing of other instances in ring R's.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although various examples are described above that illustrate usage in Oracle Cloud or Kubernetes environments, the various components, processes, and features described herein can be used with other types of container orchestration systems, or other types of computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing software rollouts within a controller-based container orchestration system, comprising:
    a container orchestration system, including one or more processor and memory and providing, within one or more container orchestration environments:
    a runtime for containerized workloads and services operating as a plurality of software stack instances, and
    an application program interface that controllers access to perform actions upon the software stack instances;
    said container orchestration system further comprising a plurality of instance-scoped controllers operating via the application program interface provided by the container orchestration system, including, for each software stack instance within the plurality of software stack instances, an instance-scoped controller scoped to the software stack instance and responsible for:
        performing, via the application program interface, health checks and updates for the software stack instance, and
        updating, via the application program interface, an instance metadata associated with the health checks and updates for the software stack instance; and
    said container orchestration system further comprising a super controller executing on the one or more processor and memory and responsible for launching and communicating with the instance-scoped controllers associated with the plurality of software stack instances, including watching the instance metadata for the plurality of software stack instances in current use, and launching an instance-scoped controller for each software stack instance;
    wherein the super controller and instance-scoped controllers allow a desired state of a system to be declared via the instance metadata associated with the plurality of software stack instances, and then operate to realize the desired state.

2. The system of claim 1, wherein the controllers allow a desired state of a system including a configuration or version of a software stack instance, to be declared via metadata, and then operate to realize the desired state into a live state.

3. The system of claim 1, wherein when applied to a cloud computing or containerized software environment that runs single-tenant workloads of many customers or tenants, a deployment process applies software updates in a safe, controlled manner, to control the pace of updating each of the software stack instances within a fleet.

4. The system of claim 1, wherein the deployment process operates within rings and working sets of instances to update a previously deployed version of the controller/instance, and deploy an updated version.

5. The system of claim 1, wherein each software stack instance provides an instantiation of a software stack that has been deployed for a specific tenant.

6. The system of claim 1, wherein the instance metadata format can be augmented to include fields associated with specifying a relative importance of a particular software stack instance with respect to other software stack instances in a fleet.

7. The system of claim 1, wherein the system operates to provide software rollouts within the container orchestration system, including:
    during a first phase of a deployment process updating a version associated with the super controller; and
    during a subsequent phase of the deployment process gradually updating the version associated with the software stack instances.

8. A method for providing software rollouts within a controller-based container orchestration system, comprising:
    providing a container orchestration system that provides within one or more container orchestration environments, a runtime for containerized workloads and services operating as a plurality of software stack instances;
    providing a plurality of instance-scoped controllers including, for each software stack instance within the plurality of software stack instances, an instance-scoped controller scoped to the software stack instance and responsible for:
        performing health checks and updates for the software stack instance, and
        updating an instance metadata associated with the health checks and updates for the software stack instance; and
    providing a super controller responsible for launching and communicating with the instance-scoped controllers associated with the plurality of software stack instances, including watching the instance metadata for the plurality of software stack instances in current use, and launching an instance-scoped controller for each software stack instance;

wherein the super controller and instance-scoped controllers allow a desired state of a system to be declared via the instance metadata associated with the plurality of software stack instances, and then operate to realize the desired state.

9. The method of claim 8, wherein the deployment process operates within rings and working sets of instances to update a previously deployed version of the controller/instance, and deploy an updated version.

10. The method of claim 8, wherein when applied to a cloud computing or containerized software environment that runs single-tenant workloads of many customers or tenants, a deployment process applies software updates in a safe, controlled manner, to control the pace of updating each of the software stack instances within a fleet.

11. The method of claim 8, wherein the controllers allow a desired state of a system including a configuration or version of a software stack instance, to be declared via metadata, and then operate to realize the desired state into a live state.

12. The method of claim 8, wherein each software stack instance provides an instantiation of a software stack that has been deployed for a specific tenant.

13. The method of claim 8, wherein the instance metadata format can be augmented to include fields associated with specifying a relative importance of a particular software stack instance with respect to other software stack instances in a fleet.

14. The method of claim 8, further comprising providing software rollouts within the container orchestration system, including:
during a first phase of a deployment process updating a version associated with the super controller; and
during a subsequent phase of the deployment process gradually updating the version associated with the software stack instances.

15. A non-transitory computer readable storage medium having instructions thereon, which when read and executed by a computer including one or more processors cause the computer to perform a method comprising:
providing a container orchestration system that provides within one or more container orchestration environments, a runtime for containerized workloads and services operating as a plurality of software stack instances;
providing a plurality of instance-scoped controllers including, for each software stack instance within the plurality of software stack instances, an instance-scoped controller scoped to the software stack instance and responsible for:
performing health checks and updates for the software stack instance, and
updating an instance metadata associated with the health checks and updates for the software stack instance; and
providing a super controller responsible for launching and communicating with the instance-scoped controllers associated with the plurality of software stack instances, including watching the instance metadata for the plurality of software stack instances in current use, and launching an instance-scoped controller for each software stack instance;
wherein the super controller and instance-scoped controllers allow a desired state of a system to be declared via the instance metadata associated with the plurality of software stack instances, and then operate to realize the desired state.

16. The non-transitory computer readable storage medium of claim 15, wherein the controllers allow a desired state of a system including a configuration or version of a software stack instance, to be declared via metadata, and then operate to realize the desired state into a live state.

17. The non-transitory computer readable storage medium of claim 15, wherein when applied to a cloud computing or containerized software environment that runs single-tenant workloads of many customers or tenants, a deployment process applies software updates in a safe, controlled manner, to control the pace of updating each of the software stack instances within a fleet.

18. The non-transitory computer readable storage medium of claim 15, wherein the deployment process operates within rings and working sets of instances to update a previously deployed version of the controller/instance, and deploy an updated version.

19. The non-transitory computer readable storage medium of claim 15, wherein the instance metadata format can be augmented to include fields associated with specifying a relative importance of a particular software stack instance with respect to other software stack instances in a fleet.

20. The non-transitory computer readable storage medium of claim 15, further comprising providing software rollouts within the container orchestration system, including:
during a first phase of a deployment process updating a version associated with the super controller; and
during a subsequent phase of the deployment process gradually updating the version associated with the software stack instances.

\* \* \* \* \*

UNITED STATES PATENT AND TRADEMARK OFFICE
CERTIFICATE OF CORRECTION

| | | |
|---|---|---|
| PATENT NO. | : 11,900,094 B2 | |
| APPLICATION NO. | : 17/510037 | |
| DATED | : February 13, 2024 | |
| INVENTOR(S) | : Simone et al. | |

It is certified that error appears in the above-identified patent and that said Letters Patent is hereby corrected as shown below:

In the Specification

In Column 10, Line 39, delete "desired Version" and insert -- desiredVersion --, therefor.

In Column 10, Line 48, delete "desired Version" and insert -- desiredVersion --, therefor.

Signed and Sealed this
Fourteenth Day of May, 2024

Katherine Kelly Vidal
*Director of the United States Patent and Trademark Office*